United States Patent [19]

Bianco et al.

[11] Patent Number: 5,640,932

[45] Date of Patent: Jun. 24, 1997

[54] APPARATUS FOR AND METHOD OF DETERRING ENTRY OF AN ANIMAL INTO A BARRIER REGION

[75] Inventors: Frank J. Bianco, Pembroke Pines; Lance Ehren, Bay Harbor, both of Fla.

[73] Assignee: Elexis Corporation, Miami, Fla.

[21] Appl. No.: 33,798

[22] Filed: Mar. 18, 1993

[51] Int. Cl.$^6$ ........................................ A01K 15/02
[52] U.S. Cl. ........................................ 119/720
[58] Field of Search .................. 119/908, 719, 119/720, 721; 340/573

[56] References Cited

U.S. PATENT DOCUMENTS

| | | |
|---|---|---|
| 2,741,224 | 4/1956 | Putnam . |
| 2,800,104 | 7/1957 | Cameron et al. . |
| 2,996,043 | 8/1961 | Pettingill . |
| 3,336,530 | 8/1967 | Sloan et al. . |
| 3,589,337 | 6/1971 | Doss . |
| 3,608,524 | 9/1971 | Waltz . |
| 3,753,421 | 8/1973 | Peck . |
| 3,823,691 | 7/1974 | Morgan . |
| 3,980,051 | 9/1976 | Fury . |
| 4,153,009 | 5/1979 | Boyle . |
| 4,202,293 | 5/1980 | Gonda et al. . |
| 4,335,682 | 6/1982 | Gonda et al. . |
| 4,399,432 | 8/1983 | Lunn . |
| 4,539,937 | 9/1985 | Workman . |
| 4,627,385 | 12/1986 | Vinci . |
| 4,630,571 | 12/1986 | Palmer .................. 119/908 X |
| 4,733,633 | 3/1988 | Yarnall, Sr. et al. . |
| 4,794,402 | 12/1988 | Gonda et al. . |
| 4,802,482 | 2/1989 | Gonda et al. . |
| 4,898,120 | 2/1990 | Brose ...................... 119/720 |
| 5,061,918 | 10/1991 | Hunter . |
| 5,067,441 | 11/1991 | Weinstein ................. 119/720 |
| 5,113,962 | 5/1992 | Calabrese . |
| 5,335,626 | 8/1994 | Calabrese .............. 119/908 X |

*Primary Examiner*—Thomas Price
*Attorney, Agent, or Firm*—Lowe, Price, LeBlanc & Becker

[57] ABSTRACT

Entry of a pet into a barrier region is deterred by emitting beams of compressional wave pulses from plural above ground sites in the region. The pet wears a collar with at least one transducer for converting the compressional wave beams into electrical signals. In response to pulses of the compressional wave energy being transduced, (1) an aural sound in a frequency range which can be heard by the pet is derived by a second transducer on the collar and (2) an electric shock is selectively applied to the pet by electrodes on the collar.

31 Claims, 9 Drawing Sheets

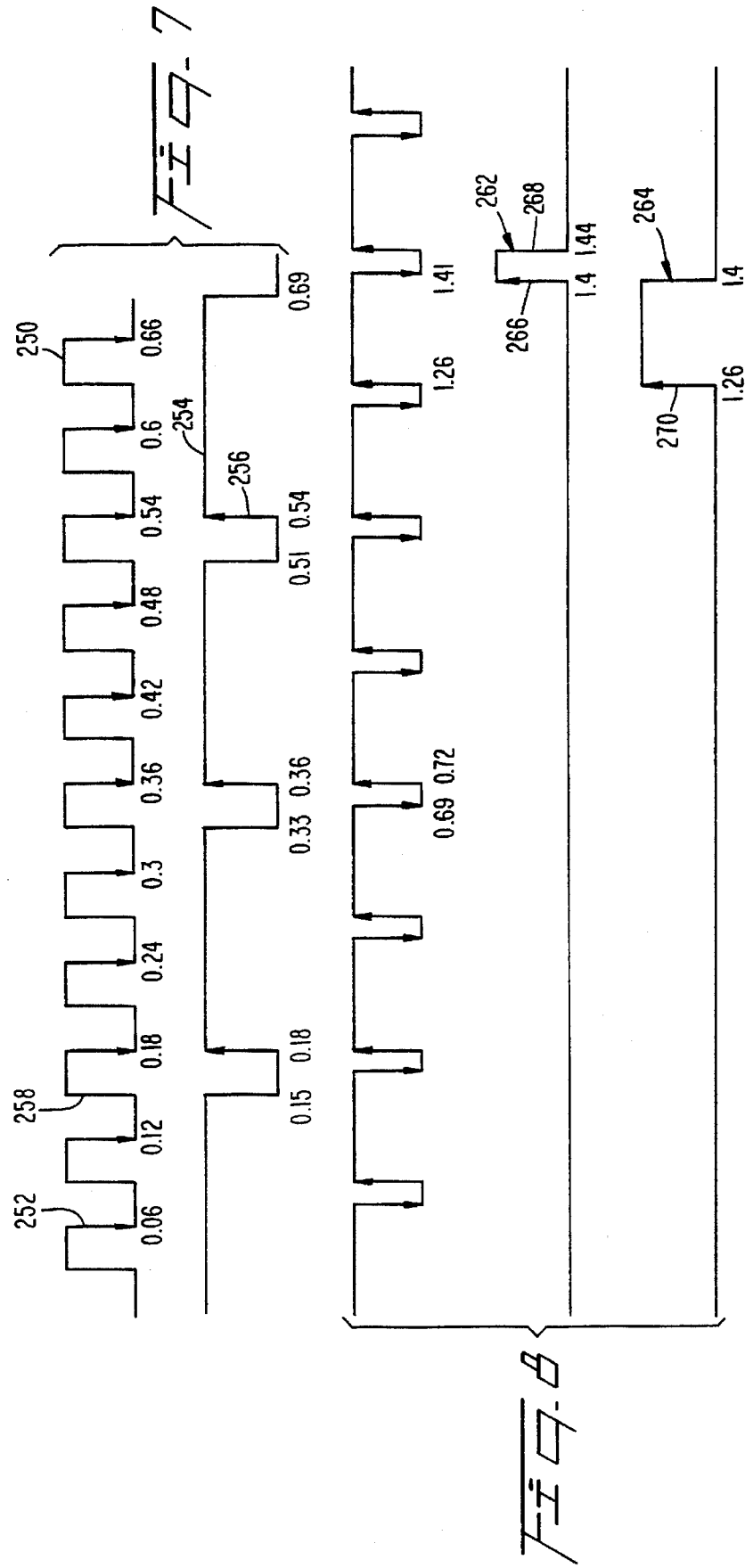

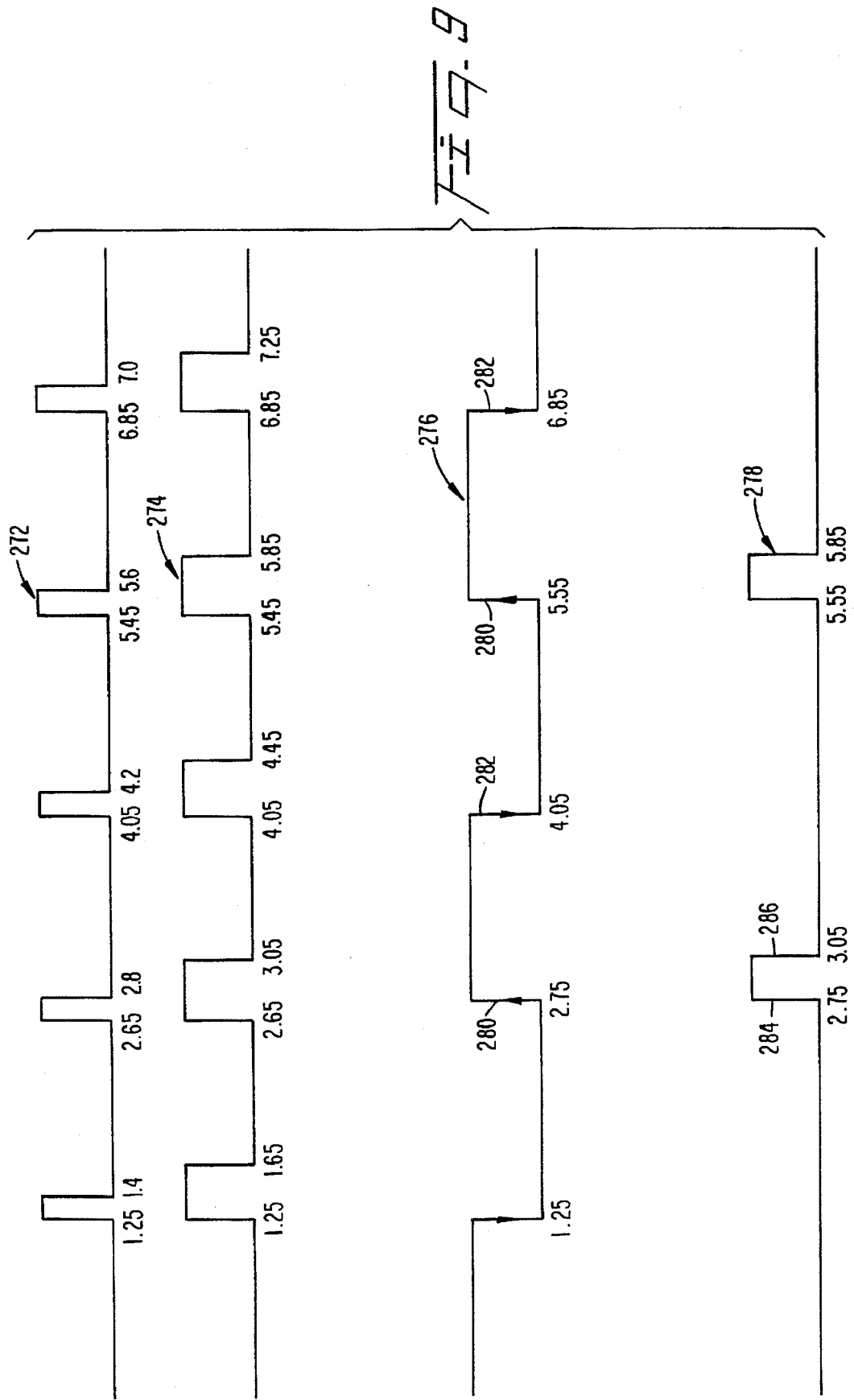

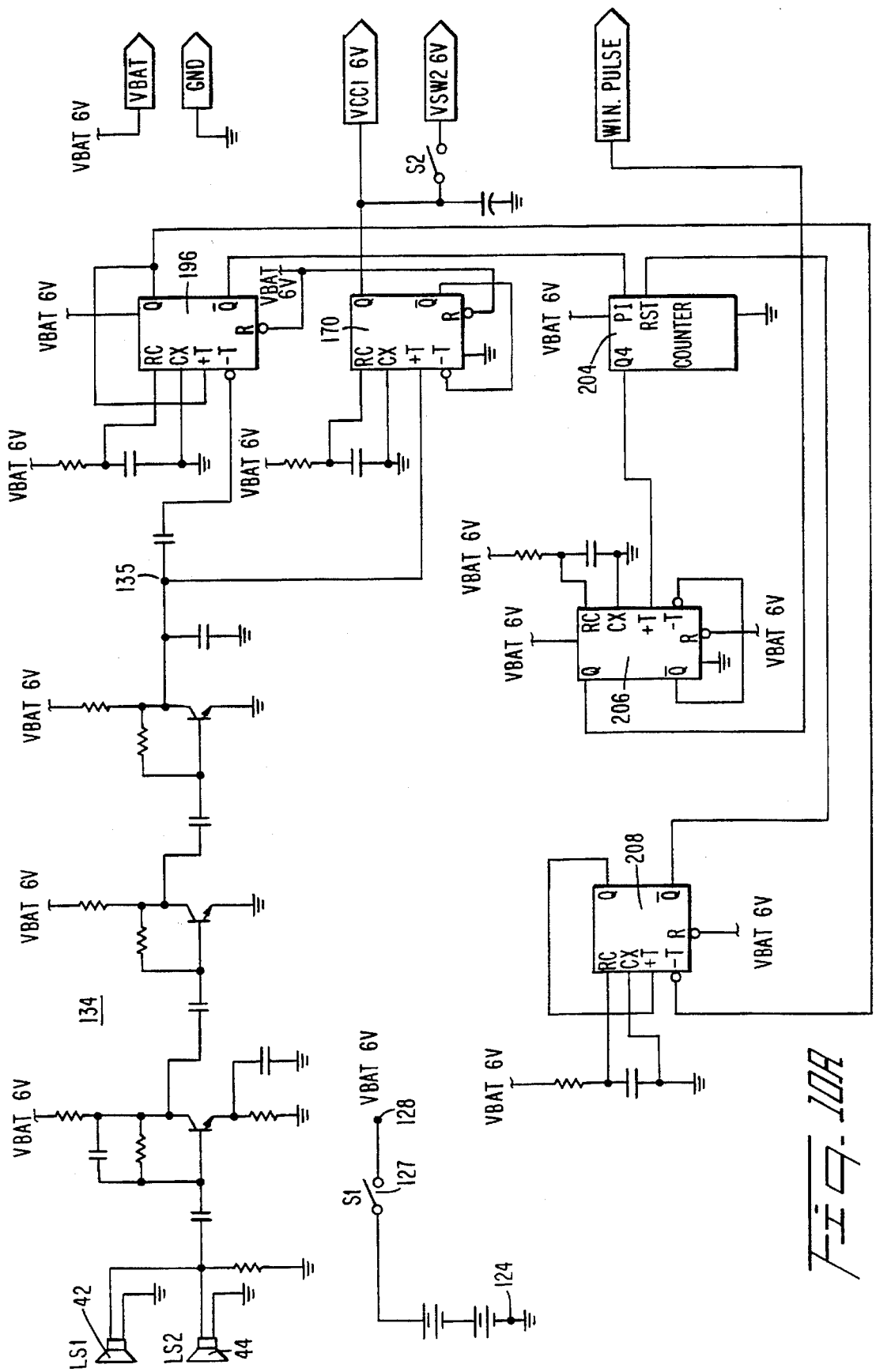

APPARATUS FOR AND METHOD OF DETERRING ENTRY OF AN ANIMAL INTO A BARRIER REGION

FIELD OF INVENTION

The present invention relates generally to apparatus for and method of training an animal, specifically to deter entry of the animal into a barrier region, and more particularly to such a method and apparatus including at least one of the following features: (1) emitting a radiant energy beam from an above ground site in the region, (2) generating a training stimulus in response to receipt at the animal of a compressional wave beam having a predetermined characteristic and (3) automatically applying mild and severe training stimuli to the animal such that the severe stimulus is applied only if the mild stimulus is unsuccessful.

BACKGROUND ART

It is often desirable to train an animal, particularly a pet, in various ways, particularly to inhibit movement of the animal through a barrier region. One currently marketed prior art system is disclosed by Peck, U.S. Pat. No. 3,753,421 wherein a signal emitting wire defines a barrier region; a similar system is disclosed by Yarnall et al., U.S. Pat. No. 4,733,633. In both of these systems, the animal whose movement is to be inhibited relative to the barrier region is equipped with a collar including a receiver responsive to a field derived from the wire. In response to the animal coming into the barrier region, where the wire is located, the receiver picks up a magnetic induction field transmitted from the wire, to trigger a circuit in the receiver to administer an electric shock to the animal. In use, the Peck et al. and Yarnall et al. systems usually involve the considerable expense of installing a subterranean wire. An expensive buried wire installation is necessary for urban and suburban situations because of the possible danger to humans in contacting an above ground wire having a considerable current flowing through it. The buried wire is a practical necessity because an above ground wire tends to become short circuited to ground by contact with plants and grasses.

Another system for inhibiting movement of an animal, particularly a pet, into and/or through a barrier region is disclosed by Fury, U.S. Pat. No. 3,980,051 wherein a trainer is provided with a first ultrasonic pulse transceiver and a second ultrasonic transceiver is worn by the animal. An ultrasonic pulse from the first transceiver is transmitted to the second transceiver. In response to the second transceiver receiving a pulse from the first transceiver, the second transceiver transmits a corresponding pulse back to the first transceiver. Round-trip transit time of the ultrasonic pulses from the first transceiver to the second transceiver and back to the first transceiver is measured at the first transceiver. In response to the round-trip transit time exceeding a predetermined duration, associated with the animal entering the barrier region, the first transceiver transmits an animal whistle sound. The animal whistle sound is designed to inhibit movement of the animal through the barrier region. A problem with the Fury system is that it is not well suited to confining an animal to a designated area because the transit time to one portion of the barrier region is likely to differ from the transit time to another portion of the barrier region. In addition, the whistle sound may be ineffective because it is transmitted from the first transceiver over a substantial distance to the pet.

In the co-pending, commonly assigned and invented application entitled "Method of and Apparatus for Training an Animal," Ser. No. 08/002,486, filed Jan. 8, 1993, there is disclosed a device for deterring entry of an animal into a barrier region. The device disclosed in the co-pending application is particularly adapted for indoor situations wherein the animal is deterred from entering a barrier region in close proximity to a housing emitting an inductive magnetic field. The animal wears a collar having mounted thereon a housing with a coil responsive to the inductive magnetic field. In response to the inductive magnetic field being incident on the coil and being detected by electronic circuitry in the housing, an acoustic signal is coupled back to the housing which originally emitted the magnetic induction field. The housing which emitted the induction magnetic field responds to the compressional wave coupled to it to emit an acoustic click which is heard by the animal and deters entry of the animal into proximity with the housing. While this prior art system functions admirably for its desired purpose, it is not suitable for long-range situations, such as for deterring entry of an animal into a designated outside barrier region.

It is, accordingly, an object of the present invention to provide a new and improved method of and apparatus for training an animal, and particularly to training an animal so entry of the animal into a barrier region is deterred.

Another object of the invention is to provide a new and improved method of and apparatus for deterring entry of an animal into a designated outdoor barrier region, which apparatus is relatively inexpensive and uses above ground radiant energy wave beam sources.

Another object of the present invention is to provide a new and improved method of and apparatus for deterring entry of an animal into a designated region by utilizing plural compressional wave energy sources in housings on posts easily driven into the ground at plural relatively distantly spaced locations, to minimize costs associated with installation and maintenance of the apparatus.

THE INVENTION

In accordance with one aspect of the invention, a method of deterring entry of an animal into a barrier region comprises emitting a beam of radiant wave energy from an above ground source in the region. In response to receipt of the radiant wave energy in the beam at the animal, a stimulus tending to prevent entry of the animal into the beam is applied to the animal. In the preferred embodiment the radiant wave energy is a compressional wave beam having an ultrasonic frequency and a plurality of such beams are emitted from plural discrete sites along the barrier. A compressional wave beam is particularly advantageous because it is unaffected by environmental factors, e.g. weather, and has a limited range. Limited range is important to prevent false triggering when the animal is permissibly outside of the region.

In accordance with another aspect of the invention, an apparatus for use in deterring entry of an animal into a barrier region comprises a post adapted to be anchored into the ground. When the post is anchored, a housing on the post is located at a height above the ground that is about the same as a collar of the animal. The housing includes an emitter of a radiant energy beam that propagates to a receiver on the collar of the animal. Preferably the housing is arranged to emit a pair of such beams in different, preferably selectable, directions.

According to a further aspect of the invention, apparatus for use in deterring entry of an animal into a barrier region comprises housing means adapted to be mounted on the animal. The housing means includes: (a) a transducer for converting compressional wave energy having a predetermined characteristic into an electric signal, and (b) means responsive to the electrical signal for applying to the animal a stimulus tending to prevent entry of the animal into the region. The predetermined characteristic is such that the electric signal is not falsely generated in response to compressional wave noise which is similar to the predetermined characteristic. To this end, in the preferred embodiment the predetermined characteristic is a series of pulsed bursts having a predetermined carrier frequency; the electric signal is derived in response to at least a predetermined number of such bursts being received and converted into an electric signal by the transducer.

In accordance with another aspect of the invention, an apparatus for deterring movement of an animal across a barrier region comprises means in the region for emitting plural radiant wave energy beams having a predetermined characteristic along the barrier region. The animal includes a transducer for converting the radiant wave energy in the beams into an electric signal that causes a stimulus to be applied to the animal. The stimulus tends to prevent movement of the animal into the barrier region. In a preferred embodiment, beams of the radiant wave energy are emitted from plural discrete points in the region.

The above and still further objects, features and advantages of the present invention will become apparent upon consideration of the following detailed descriptions of specific embodiments thereof, especially when taken in conjunction with the accompanying drawings.

BRIEF DESCRIPTION OF THE DRAWING

FIGS. 7–9 are waveforms, having differing time scales and bases, used to describe the operation of the circuit of FIGS. 6a and 6b; and FIGS. 10a and 10b, together, are a circuit diagram of a second preferred embodiment of the electronic circuitry included in the collar mounted housing.

DETAILED DESCRIPTION OF THE DRAWING

Figure 1:
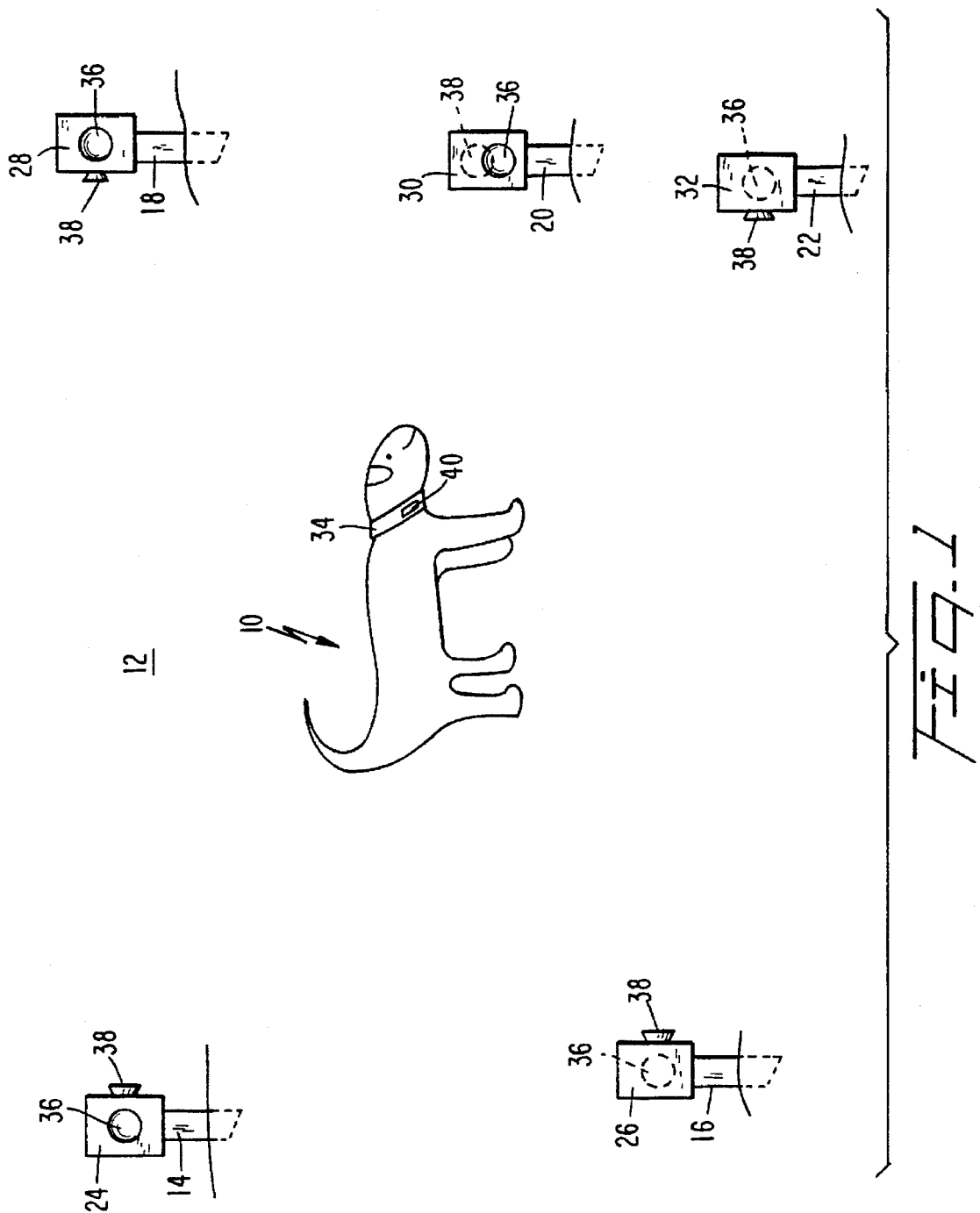
FIG. 1 is a schematic diagram of a preferred embodiment of the present invention.

Reference is now made to FIG. 1 of the drawing, wherein dog 10 is illustrated as being in area 12, bounded by posts 14, 16, 18, 20 and 22, on which are respectively mounted housings 24, 26, 28, 30 and 32. Each of posts 14–22 is anchored by being driven into the ground at the boundary or periphery of area 12, to define a barrier region which dog 10 should not cross. Each of housings 24–32 is at a height above the surface of the ground, equal approximately to the height of collar 34 on dog 10 above the ground, while the dog is walking. Housings 24–32 are positioned such that there is a line of sight between each housing and collar 34 for a predetermined distance, typically 25 feet, along the boundary of area 12.

Each of housings 24–32 includes two active electro-compressional radiant energy wave piezo-electric transducers 36 and 38, each continuously emitting or radiating a compressional wave beam having an effective range and beam width of approximately 35 feet and ±15°, respectively. The bore sight axes of the beams emitted by transducers 36 and 38 are generally parallel to the ground, i.e., at right angles to the post carrying the housing. The bore sight axes of the beams emitted from transducers 36 and 38 of a single housing are oppositely directed, or at right angles to each other or at other angles, as described infra. Transducers 36 and 38 emit compressional wave pulses having a repetition rate of 15 Hz and a duty cycle of 5%. The pulses have a carrier frequency of approximately 40 kHz, sufficiently high that it cannot be heard by dog 10, other pets, or human beings.

Transducers 36 and 38 on housings 24, 26, 28 and 32 are positioned at right angles to each other so that the bore sight axes of the beams emitted thereby are at right angles to each other. In contrast, transducers 36 and 38 of housing 30 are on parallel faces of the housing so that the bore sight axes of the beams emitted from housing 30 are 180° displaced from each other.

Figure 2:
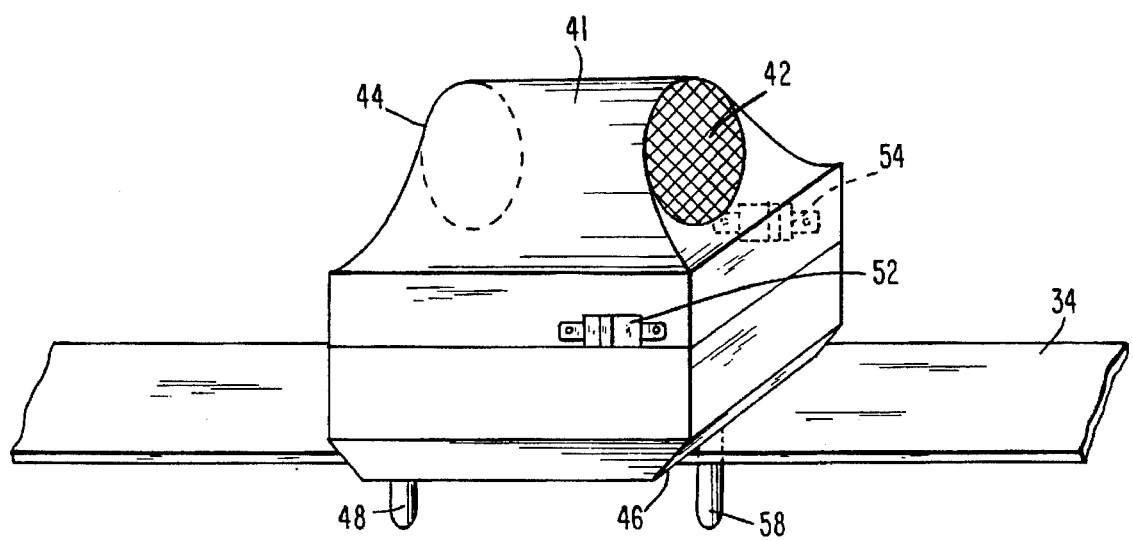
FIG. 2 is a perspective view of a collar mounted housing in accordance with the present invention.

Collar 34 on dog 10 includes housing 40 on which are mounted electro-compressional wave piezo-electric transducers 42 and 44, FIG. 2, having beam patterns with bore sight axes that are displaced 180° from each other, i.e., are oppositely directed. Transducers 42 and 44 derive waveforms that are replicas of compressional waves incident thereon and are connected to circuitry on collar 34 for detecting the presence of many pulses of the 40 kHz compressional wave energy emitted by transducers 36 and 38. The detecting circuitry activates electro-compressional wave, piezo-electric beeper transducer 46 which supply an aural signal to dog 10 and electrodes 48 and 50 which administers a shock to the dog. Transducer 46 derives a compressional wave click having a frequency of 5.4 kHz (the frequency at the peak of the acoustic response of dog 10 and hence most easily heard by the dog) in response to eight pulses from one of transducers 36 or 38 being received by one of transducers 42 or 44. The click warns dog 10 that he is entering the barrier region. In one embodiment if dog 10 continues to enter or step in the barrier region, a second series of multiple pulses from one of transducers 36 or 38 is detected and a second click is derived from transducer 46 while a high voltage, low current shock is administered to the dog by electrodes 48 and 50. In a second embodiment, the click and shock are produced each time multiple pulses emitted by one of transducers 36 or 38 are received by one of transducers 42 or 44. The electric pulse applied by electrodes 48 and 50 to dog 10 acts as a more severe deterrent to the dog entering the barrier region than acoustic energy derived from transducer 46. Housing 41 carries transducers 42 and 44, as well as electronic circuit boards (not shown) with circuitry for activating transducer 46 and electrodes 48 and 50. On opposite exterior walls of housing 41, below transducers 42 and 44, two position slide switch elements 52 and 54 are carried. Element 52 is coupled to a first switch to change the electronic circuitry in housing 41 between on and off conditions, while element 54 is coupled to a second switch to control whether dog 10 is to be stimulated only by acoustic, compressional wave energy from transducer 46 or by the compressional wave energy and electric energy as applied to the dog by electrodes 48 and 50. Transducers 42 and 44 and housing 41 are arranged so the centers of the transducers are approximately 1.5" from collar 34. Thereby, the acoustic, compressional wave energy in the beam from transducers 36 and 38 is incident, in a relatively unimpeded manner, on the transducers, without being blocked by the hair of long-haired dogs. Transducers 42 and 44 are mounted on opposite facing walls of housing 41 and arranged so the bore signs axes of the patterns thereof are oppositely directed, parallel to the elongated direction of collar 34. Electrodes 48 and 50 extend downwardly from housing 41, through collar 34, and the hair of the dog so they contact the skin of the dog; electrodes 48 and 58 typically have a length of approximately ¾". Sound emitting transducer 46 is mounted on housing 41 so collar 34 passes through a slot between the hollow face of housing 41 and an upper face of a housing for the transducer. The active sound emitting face of transducer 46 abuts against the collar hair of dog 10.

Figure 3:
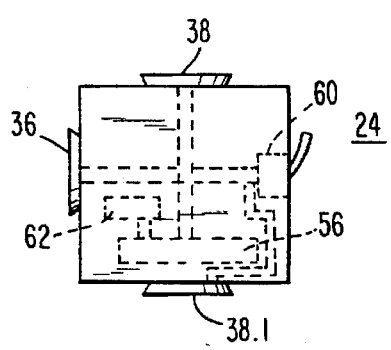
FIG. 3 is a top view of one embodiment of a housing that can be used in the system of FIG. 1 for emitting pulsed compressional wave beams defining a barrier region boundary.

Since all of housings 24–32 in a particular installation, which is generally sold in kit form, have the same configuration, a description of housing 42 suffices for the remaining housings. According to one embodiment, as illustrated in FIG. 3, housing 24 is a sealed parallelepiped having three electro-compressional wave transducers 36, 38 and 38.1 fixedly mounted on mutually orthogonal exterior walls. Transducers 38 and 38.1 are mounted on opposite, parallel side walls of housing 24 so the bore sight axes of the beams thereof are oppositely directed, while transducer 36 is mounted on a housing wall at right angles to the walls carrying transducers 38 and 38.1. The bore sight axis of the emitted beam from transducer 36 is at right angles to the bore sight axes of the beams transmitted from transducers 38 and 38.1. Inside housing 24 are circuit board 56 carrying an energizing circuit for the transducers, and double pole-double throw switch 60 for selecting two of the transducers.

At any one time, beams are radiated from only two of the transducers of housing 24. In the situation illustrated in FIG. 1, beams with 90° displaced bore sight axes are emitted from transducers 36 and 38 of housings 24, 26, 28 and 32. In contrast, the bore sight axes of the beams emitted from transducers 38 and 38.1 of housing 30 are displaced 180°. Housing 30 is on a straight line between housings 28 and 32, which are more distantly spaced from each other than the remaining housings. Switch 60 controls which of transducers 36 and 38 is energized by electric waves from circuit board 56 in housing 24. Switch 60 selectively connects output terminals of circuit board 56 to one of transducers 36 or 38.1, while transducer 38 is permanently connected to the output terminals of circuit board 56. Housing 24 also includes battery 62 and suitable sealing gaskets (not shown) for preventing ingress of liquids and the like.

Figure 4:
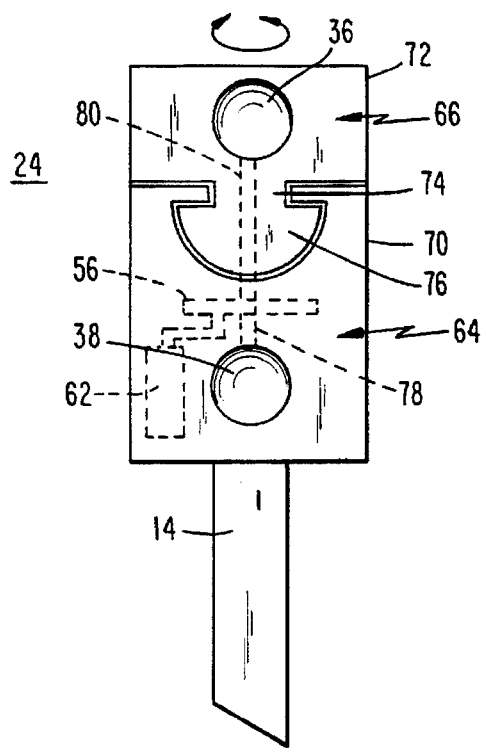
FIG. 4 is a side view of a second embodiment of a housing that can be employed in the system of FIG. 1 for emitting pulsed compressional wave energy beams defining a barrier region boundary.

A second embodiment of housing 24 is illustrated in FIG. 4 as including only a single pair of electro-compressional wave transducers 36 and 38. Housing 24, as illustrated in FIG. 4, is arranged so transducer 38 can be rotated about the axis of post 14 to any angle relative to fixed transducer 36. Housing 24, FIG. 4, includes two cylindrical, coaxial segments 64 and 66 on which are respectively mounted transducers 36 and 38. Upper segment 66 is rotatable about a vertical axis that is coincident with the vertical axis of stationary segment 64, which is mounted on vertically extending electrically insulating rigid post 14 that is adapted to be easily driven into the ground.

Housing segments 64 and 66 respectively include aligned vertically extending cylindrical, electrically insulated side walls 70 and 72 on which are respectively mounted transducers 36 and 38. Extending downwardly from housing portion 66 is shaft 74, having an axis coincident with the common axis of housing segments 64 and 66. Hemispherical boss 76 extends downwardly from shaft 74. The exterior walls of boss 76 and shaft 74 engage correspondingly shaped walls in housing segment 64, to provide a liquid impervious seal to the interior of housing segment 64. Circuit board 56 and battery 62 are fixedly mounted in housing segment 64. Circuit board 56 is connected to transducers 36 and 38 via electric leads 78 and 80, respectively. Lead 80 extends through the walls of boss 80 and the corresponding wall of housing segment 64.

In use, housing segment 66 can be positioned as shown, so transducers 36 and 38 are pointed in opposite directions. Alternatively, housing segment 66 can be turned so the bore sight axis of the beam of transducer 38 is at any desired angle relative to the bore sight axis of transducer 36; e.g. the bore sight axes can be at right angles, as shown for housings 26 and 28 in FIG. 1.

Figure 5:
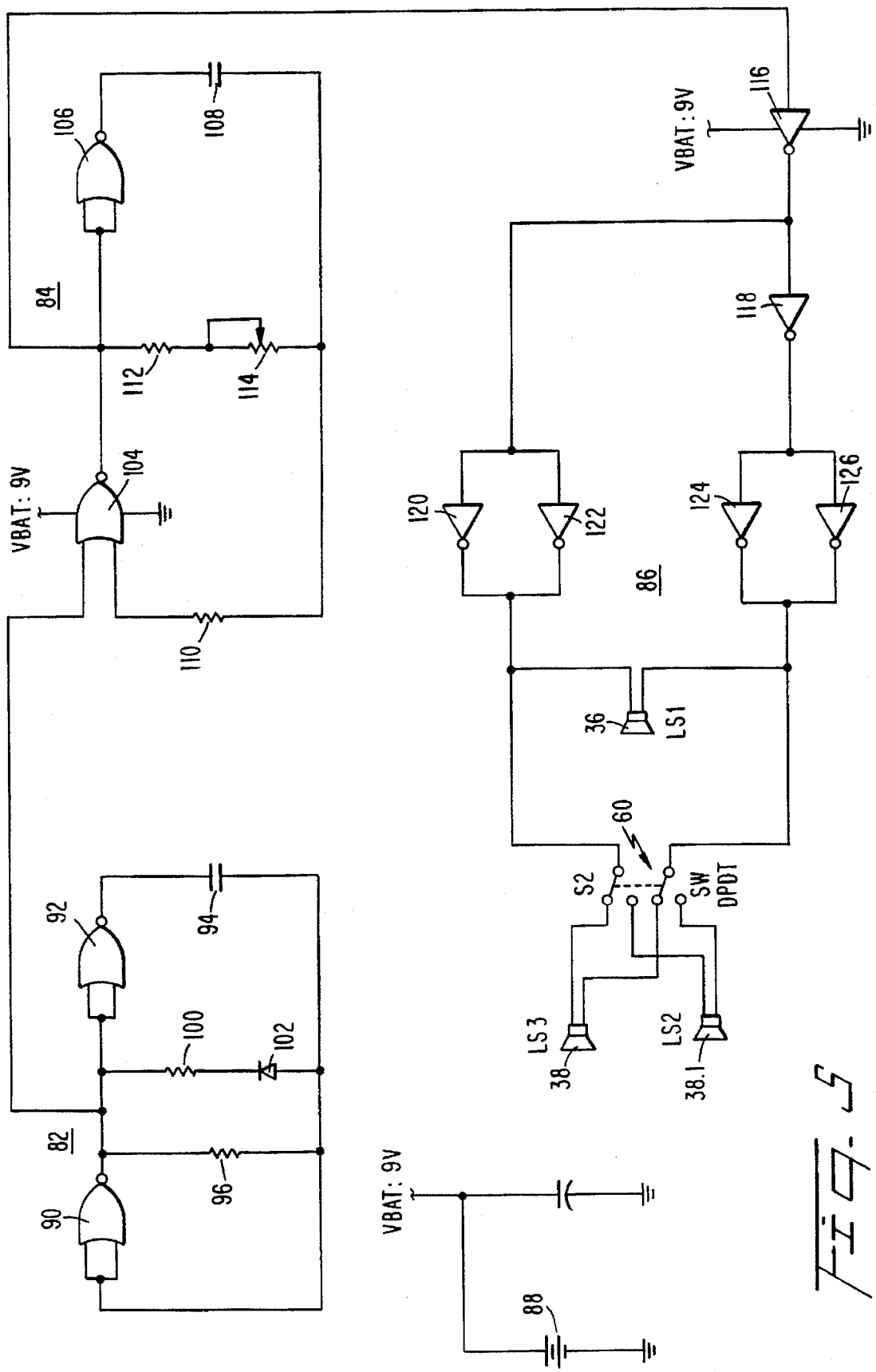
FIG. 5 is a schematic diagram of a preferred embodiment of the electronic circuitry included in the post mounted housing of FIG. 3.

A circuit diagram of a preferred embodiment of the circuitry included on circuit board 56, FIG. 3, is illustrated in FIG. 5 as including low frequency (15 Hertz) oscillator 82 and high frequency (40 kHz) oscillator 84, as well as amplifier 86 which drives transducers 36 and 38 or transducers 36 and 38.1 in parallel. All of the circuitry is powered by 9 volt, preferably alkaline, battery 88.

Oscillator 82 includes cascaded NOR gates 90 and 92, connected to each other via a feedback path including capacitor 94, connected between the output terminal of NOR gate 92 and the input terminals of NOR gate 90. A common terminal between the output terminal of NOR gate 90 and the input terminals of NOR gate 92 is connected to first and second parallel branch circuits respectively including resistor 96, and resistor 100 in series with diode 102. The values of components 94–102 are such that there is derived at the output terminal of NOR gate 90 a rectangular wave having a frequency of 15 Hz and a duty cycle of 5 percent, i.e., during 5 percent of each 15 Hz cycle, the voltage at the output terminal of NOR gate 90 has a positive value and the voltage at the output of NOR gate 90 has a 0 value during the remainder of each cycle.

While a positive level is at the output of NOR gate, oscillator 84 is activated so it derives a 40 kHz square wave; oscillator 84 is inactive while a 0 level is at the output of NOR gate 90. To these ends, oscillator 84 includes cascaded NOR gates 104 and 106, connected so the output of NOR gate 104 is connected to the input of NOR gate 106 and the output of NOR gate 106 is connected via capacitor 108 and resistor 110 to one input of NOR gate 104, the other input of which has a DC connection to the output of NOR gate 90. A common terminal for the output of NOR gates 104 and 106 is connected to a common terminal for capacitor 108 and resistor 110 by the series combination of fixed resistor 112 and variable resistor 114, the value of which controls the frequency of the high frequency of oscillator 84. In a preferred embodiment, NOR gates 90, 92, 104 and 106 are in a single CD 4001 quad NOR gate integrated circuit package.

Amplifier 86 responds to 15 Hz bursts of the 40 kHz carrier to drive transducer 36 and one of transducers 38 or 38.1 in push-pull. To this end, amplifier 86 includes inverters 116, 118, 120, 122, 124 and 126, all of which are preferably included in a CD 4049 single integrated circuit package. Inverter 116 has an input DC coupled to the common terminal of NOR gates 104 and 106. Inverter 116 includes an output terminal for driving inverters 120 and 122 in parallel, while inverter 118 drives inverters 124 and 126 in parallel. The parallel outputs of inverters 120 and 122 and inverters 124 and 126 are permanently connected to opposite terminals of transducer 36 and are selectively connected via the double pole-double throw contacts of switch 60 to the terminals of transducer 38 or 38.1. If a housing of the type illustrated in FIG. 4 is employed, the contacts of switch 60 and transducer 38.1 are excluded.

While enabled, oscillator 84 derives 40 kHz square waves having a minimum voltage of 0 and a peak voltage of +9 volts, the voltage level of DC source 88. Inverters 120–126 convert the output voltage of oscillator 84 into push-pull voltage that is applied to transducer 36 and to one of transducers 38 or 38.1. The resulting push-pull 40 kHz drive applied to transducer 36 and one of transducers 38 or 38.1 results in a compressional wave having a 140 db intensity at 1.5 inches from each emitting transducer. The beam thus has sufficient intensity, under normal operating conditions, for a maximum range between the excited transducer and dog collar 34 of approximately 37 feet, so adjacent posts along a common boundary line can be spaced by as much as 74 feet, if there is a line of sight between the housings on the posts and collar 34. However, a maximum spacing of 25 feet is usually recommended.

Figure 6A:
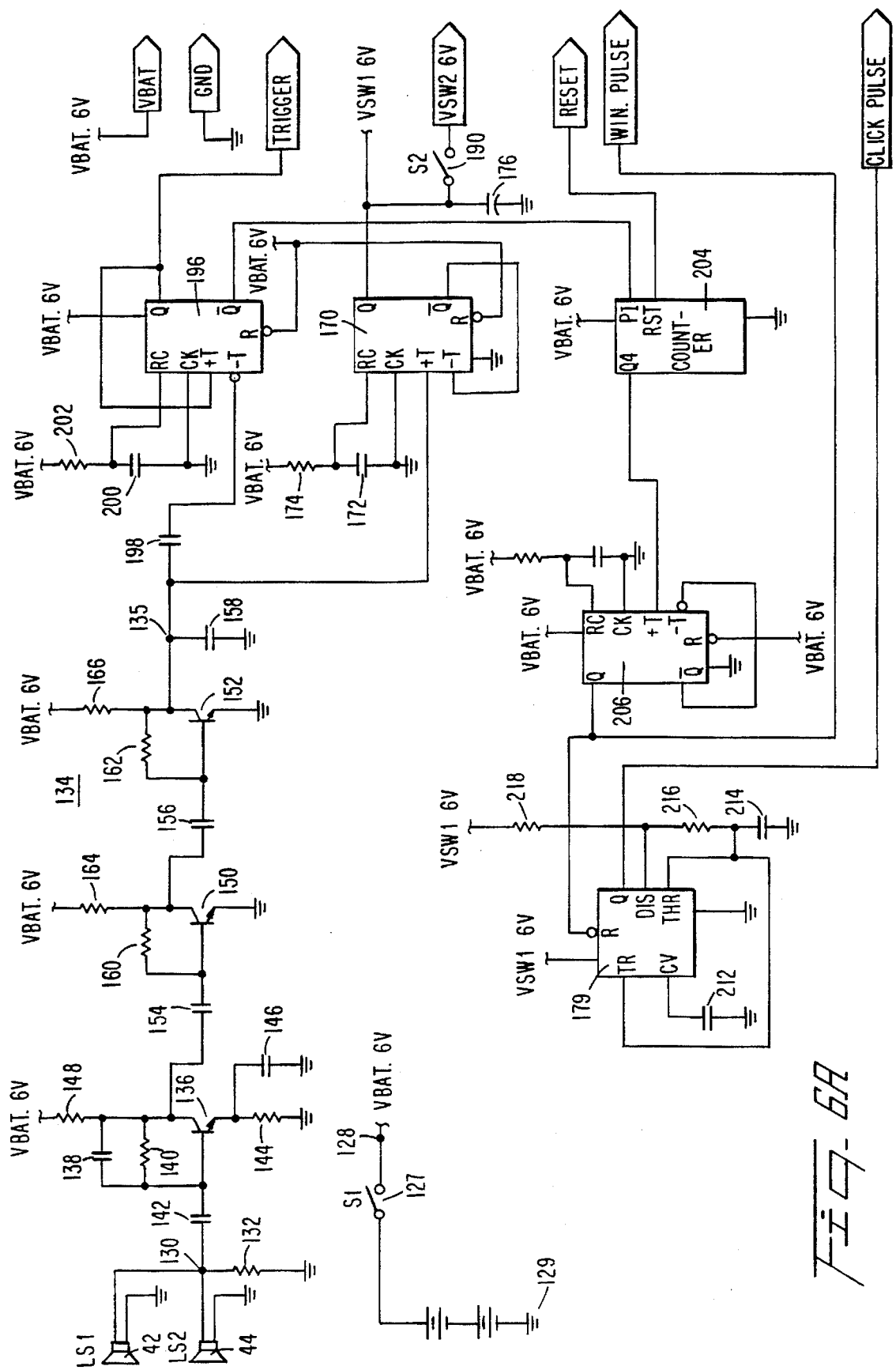
FIGS. 6a and 6b, together, are a circuit diagram of one preferred embodiment of the electronic circuitry included in the collar mounted housing of FIG. 4.
Figure 6B:
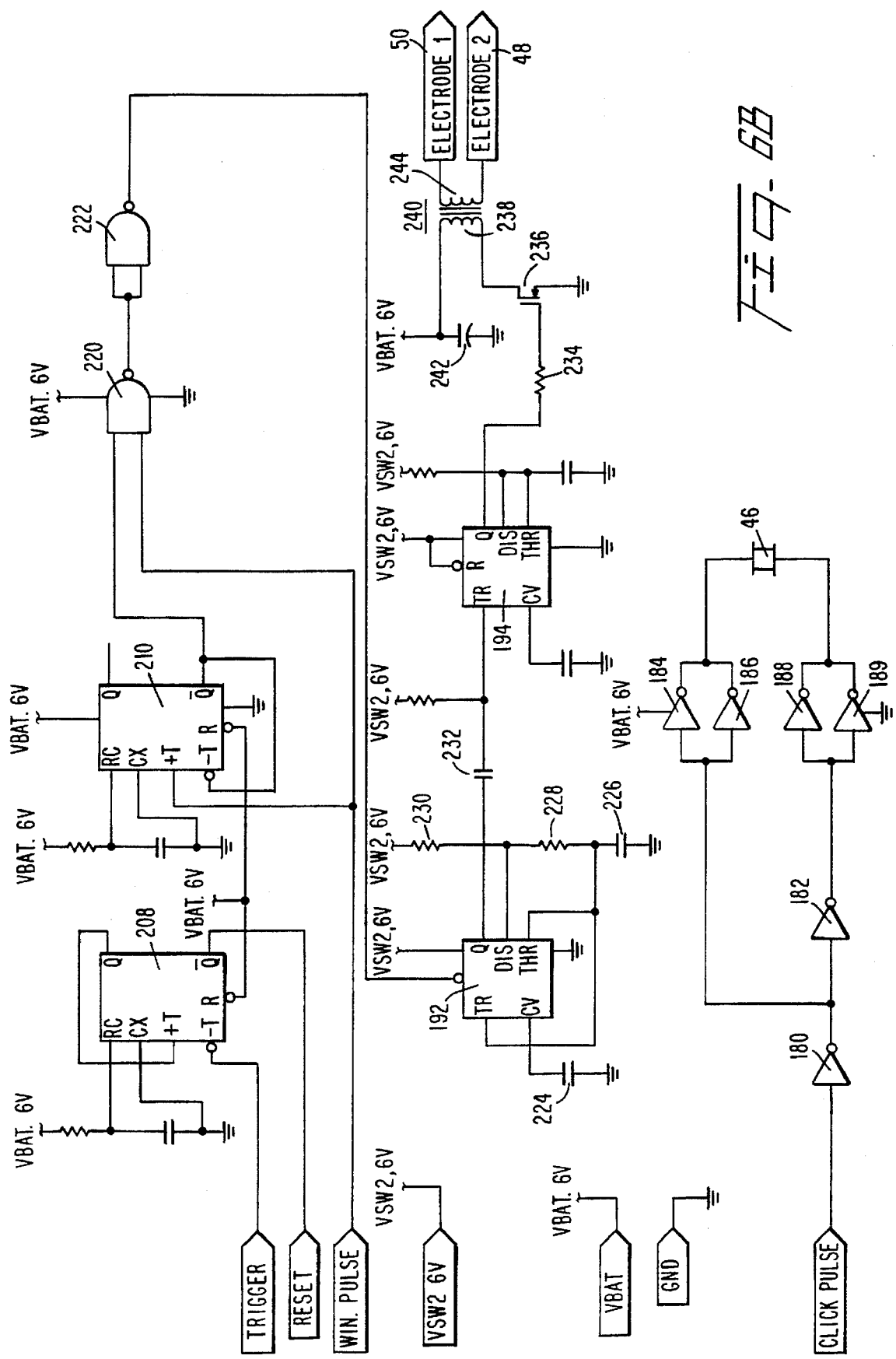

Reference is now made to FIGS. 6a and 6b, together forming a circuit diagram of the circuitry included on one or more printed circuit boards included in housing 41 on collar 34 of dog 10. All of the circuitry in housing 41 is preferably powered by two three volt series connected lithium batteries, connected between power supply terminal 128 and ground 129.

Voltage generating transducers 42 and 44, spatially positioned so the bore sight axes of the beams thereof are oppositely directed along a common line extending generally parallel to the portion of collar 34 on which housing 41 is attached, are electrically connected in parallel to common node 130, connected to ground via load resistor 132. The voltage developed across load resistor 132 is a replica of the compressional wave energy incident on one of transducers 42 and 44. If transducers 42 and 44 are sufficiently close to a pair of housings 24–32 to cause significant outputs to be derived from both of the transducers, the wave at node 130 is a composite waveform of the outputs of both transducers.

Circuit 134 responds to the voltage at node 130 to derive an output voltage at terminal 135 that is a replica of the 15 Hz pulses at the node. To these ends, circuit 134 includes a band pass filter for detecting the presence of 40 kHz waves at node 130. The 40 kHz detector includes npn transistor 136, connected in the common emitter mode, with a collector-base feedback network including the parallel combination of sensitivity controlling capacitor 138 and resistor 140 between the collector and base of transistor 136. The base of transistor 136 is AC coupled to node 130 by series capacitor 142. The emitter of transistor 136 is connected to ground by the parallel combination of resistor 144 and capacitor 146. The collector of transistor 136 is connected by resistor 148 to power supply terminal 128. The components connected to the electrodes of transistor 136 have values causing the transistor to switch state and become conducting in response to 40 kHz waves being at node 130. Thereby, the voltage at the collector of transistor 136 is a substantial replica of the output of high frequency oscillator 84 when collar 34 is in the boundary defined by the radiant energy compressional waves emitted from transducers 36 and 38 of housings 24–32.

The voltage at the collector of transistor 136 is converted by the circuitry connected to transistors 150 and 152 into a 15 Hz rectangular wave (at terminal 135) that is a substantial replica of the output of low frequency oscillator 84. Transistors 150 and 152 are AC coupled with each other and transistor 136 via series capacitors 154 and 156. The collector emitter path of transistor 152 is shunted by capacitor 158. Capacitors 154 and 156, in combination with feedback resistors 160 and 162 and collector load resistors 164 and 166, form a high pass filter, while resistor 166 and capacitor 158 form a low pass filter for amplifying 15 Hz wave and removing the 40 kHz carrier superimposed thereon. When collar 34 is not in the beam propagated from any of housings 24–32, the voltage at the collector terminal 135 is at a quiescent value; when collar 34 is in the beam the voltage at terminal 135 substantially follows the 15 Hz variations of oscillator 82.

To minimize energy drawn from the lithium batteries connected between terminals 128 and 129 while contacts 127 are closed by slide element 52, a considerable amount of the circuitry for activating speaker 46 and electrodes 48 and 50 is normally shut off, i.e., the energizing circuit is deactivated when dog 10 is not in proximity to the beams emitted from housings 24–32. To these ends, monostable multivibrator 170 senses when the voltage across 5 capacitor 158 is above a minimum level associated with one of transducers 42 or 44 being in the beam emitted from one of housings 24–32. Monostable multivibrator 170 includes plus trigger (+T) input terminal DC coupled to junction 135. Monostable multivibrator 170 includes timing terminals RC and CX, connected across the electrodes of capacitor 172, in turn connected in series with resistor 174 and power supply terminal 128. Capacitor 172 and the charging circuit including capacitor 172 has a long time constant, e.g. 10 seconds.

The voltage at the Q output of monostable multivibrator 170 is applied to relatively large valued storage capacitor 176 which also tends to maintain the voltage at the Q output of monostable multivibrator 170 at a constant level for a prolonged time interval. Thereby, the voltage at the Q output of monostable multivibrator 170 has a positive six-volt level for a relatively long duration of about ten seconds in response to the voltage across capacitor 158 exceeding a predetermined level associated with transducer 42 or 44 being in the effective region of a beam emitted from one of transducers 36 or 38.

The voltage at the Q output of monostable multivibrator 170 is applied directly to power supply terminals of oscillator 179, as well as inverters 180, 182, 184, 186, 188 and 189 which selectively drive piezo-electric transducer 46 with 5.4 kHz waves. In contrast, the voltage at the Q output terminal of monostable multivibrator 170 is selectively coupled through the contacts of single pole-single throw switch 190 to power supply terminals of integrated circuits 192 and 194 which supply energizing pulses to trigger circuitry for electrodes 48 and 50. The contacts of switch 190 are responsive to the position of slide switch 54 so that when the slide switch is activated to a click only state, the contacts of switch 190 are open, and the contacts of the switch are closed in response to slide switch 54 being activated to a position corresponding with clicks and shocks both being administered to pet 10.

Monostable multivibrator 196 detects every third negative going, trailing edge of the 15 Hz negative going trailing edges which are derived across capacitor 158. To this end, monostable multivibrator 196 includes a negative trigger (−T) input AC coupled via series capacitor 198 to terminal 135. The RC and CX timing terminals of monostable 196 are connected across the electrodes of capacitor 200, series connected to the battery voltage at terminal 128 by resistor 202.

The values of capacitor 200 and resistor 202 are such that each time monostable multivibrator 196 is triggered by the negative going edge supplied to the −T input thereof, the monostable changes state for a period equal approximately to 2½ cycles of the 15 Hz voltage developed across capacitor 158. Hence, in response to every third negative going transition across capacitor 158, monostable multivibrator 196 derives positive and negative going voltages at the Q and $\overline{Q}$ outputs thereof. The resulting voltage levels are maintained for about 2½ cycles of the 15 Hz wave coupled by capacitor 198 to the −T input of monostable multivibrator 196. After this interval has elapsed, the voltages at the Q and $\overline{Q}$ outputs of monostable multivibrator 196 return to the "normal" values thereof so the voltages at the Q and $\overline{Q}$ outputs of the monostable respectively have levels of 0 and +6 volts.

Logic circuitry including ripple counter 204, monostable 206 and "window" generating monostables 208 and 210 respond to the levels at the Q and $\overline{Q}$ terminals of monostable 196 to prevent false triggering of transducer 46 and electrodes 48 and 50. False triggering can otherwise occur because of the ever-present nature of compressional waves incident on transducers 42 and 44. Monostables 206, 208 and 210 are configured essentially the same as monostables 170 and 196, except that the RC and CX terminals thereof are connected to resistors and capacitors having different values from the resistors and capacitors connected to the corresponding terminals of monostables 170 and 196.

Counter 204 senses the presence of eight pulses at the $\overline{Q}$ output of monostable 196, hence senses the presence of 15 Hz pulses from oscillator 82 over a period of 1.4 seconds. If counter 204, in fact, receives eight pulses from monostable 204 in a 1.6 second interval an acoustic tone and possibly a shock are administered to dog 10 by transducer 46 and electrodes 48 and 50. Otherwise, counter 204 is reset and the pulses supplied by monostable 196 to counter 204 are considered noise.

To these ends, counter 204 includes a clock input (PI) DC coupled to the $\overline{Q}$ output of monostable 196 and a reset (RST) input DC coupled to the $\overline{Q}$ output of monostable 208. Counter 204 is reset slightly more than 1.4 seconds after the voltage at the Q output of monostable 196 is DC coupled to the −T input of monostable 208. Counter 204 includes a Q4 output, DC coupled to the +T input of monostable 206, that derives a relatively long duration (sufficient for the compressional wave energy from transducer 46 to get the attention of dog 10) window pulse at the Q output thereof. The window pulse is supplied to reset (R) input of oscillator 179, having input terminals connected to capacitors 212 and 214 and to resistors 216 and 218. Oscillator 179 oscillates at 5.4 kHz, while power supply terminals of the oscillator are energized by a high level voltage at the Q output of monostable 170 and a high level is derived at the Q output of monostable 206.

The wave at the Q output of oscillator 179 is supplied to an input of inverter 180. Inverter 180 is connected to inverters 182–189 so opposite DC voltage levels having a frequency of 5.4 kHz are applied to opposite electrodes of piezo-electric transducer 46. In response to the 5.4 kHz voltages supplied to electrodes of transducer 46, the transducer emits 5.4 kHz acoustic energy heard by dog 10. Preferably the transducer has a characteristic frequency of 5.4 kHz.

The Q output of monostable 206 is DC coupled to the +T input of monostable 210, having a $\overline{Q}$ output, DC coupled to one input of NAND gate 220, having a second input DC coupled to the Q output of monostable 206. The output of NAND gate 220 is applied to both inputs of NAND gate 222, so gates 220 and 222 together form an AND gate. The output of gate 222 is DC coupled to a reset (R) input of integrated circuit 192, configured as a 50 Hz oscillator due to the connections thereof to capacitors 224 and 226 and resistors 228 and 230. Hence, integrated circuit oscillator 192 derives a 50 Hz square wave while power is supplied to it by the Q output of monostable 170 via closed switch contacts 190 and while the oscillator is enabled by the output of gate 222, which occurs during alternate activation cycles of transducer 46. The oscillations at the Q output of integrated circuit oscillator 192 are AC coupled via series capacitor 232 to a trigger (TR) input of integrated circuit 194, configured as a one shot multivibrator timer. In response to each negative going leading edge applied to the TR input of integrated circuit 194, the integrated circuit derives a positive, six-volt pulse having a duration of approximately 180 microseconds. In a preferred embodiment, integrated circuits 179, 192 and 194 are included in type 555 timer integrated circuit, while monostables 170, 196, 208 and 210 are included in type 4538 integrated circuit and counter 204 is a 4060 integrated circuit.

The relatively short duration pulse at the Q output of one shot integrated circuit 194 is applied via resistor 234 to the gate of field effect transistor 236, having a drain electrode connected to one terminal of primary winding 238 of transformer 240. The other terminal of winding 238 is shunted by capacitor 242 (having a relatively large value) and connected to power supply terminal 128. Transformer 240 includes secondary winding 244, having opposite terminals connected to electrodes 48 and 50. Typically, winding 244 has approximately 100 times the number of winding 238.

In response to the gate of field effect transistor 236 being forward biased by the voltage at the Q output terminal of one shot integrated circuit 194 simultaneously with the application of every other acoustic pulse to transducer 46, a low impedance path is provided for the voltage across capacitor 242 through transformer 238 to ground. High voltage AC is thereby developed in winding 244 and applied across electrodes 48 and 50 and to the skin of dog 10, beneath collar 34.

To understand more fully the operation of the circuitry illustrated in FIGS. 6a and 6b, reference is now made to the waveforms of FIGS. 7–9. In response to one of transducers 42 and 44 on dog 10 receiving the 40 kHz carrier which is derived from one of speakers 36, 38 or 38.1 as 5% duty cycle pulses having a frequency of 15 Hz, a 15 Hz rectangular wave having a 5% duty cycle is supplied to the −T input of monostable multivibrator 196. (To simplify the drawing the wave is drawn as square wave 250, instead of a rectangular wave.) The negative going, trailing edges 252 of the wave corresponding with waveform 250 trigger monostable 196 so the monostable derives waveform 254 at the Q output thereof; a complementary rectangular waveform is derived at the $\overline{Q}$ output of the monostable. Positive going transitions 256 of waveform 254 occur simultaneously with the negative going transitions 252 of waveform 250. Due to the values of resistor 202 and capacitor 200, one positive going transition 258 in waveform 254 occurs for every three negative going transitions in waveform 250 to provide a certain degree of noise immunity at the outputs of monostable 196 from acoustic waves coupled to transducers 42 and 44.

Monostable 170 responds to positive going transitions 258 in waveform 250, and the components connected thereto are configured so that a +6 volt level is derived at the Q output of monostable 170 for approximately ten seconds after each positive going transition 258. Thereby, the power supply voltages for integrated circuits elements 179, 192 and 194 are maintained at the 6 volt level for approximately ten seconds after each positive going transition 258. When no transitions in waveform 250 occur, power to integrated circuit components 179, 192 and 194 is cut off, to decrease standby current to the low microampere level.

FIG. 8 includes waveforms 260, 262 and 264, having a time scale reduced and shifted from the time scale of the waveforms of FIG. 7. Waveform 260 is the same as waveform 254, except for the reduced and shifted time scale associated with FIG. 8 relative to FIG. 7.

The resistor and capacitor connected to monostable 208 cause the monostable to have a relatively long time constant of 1.4 seconds. Hence, eight cycles of waveform 260, at the Q output of monostable 196, must occur while a reset level is derived at the $\bar{Q}$ output of monostable 208 for 1.4 seconds. This prevents false activation by spurious noise that might momentarily cause waveform 260 to be derived for less than eight cycles. The leading edge of waveform 266 occurs 1.4 seconds after the first positive going edge of waveform 260 and 10 milliseconds before the trailing edge of the seventh cycle of waveform 260, at t =1.41 seconds. The positive going edge 258 of waveform 260 results in monostable 208 producing negative going edge 268 of waveform 262.

The clock input of counter 204 responds to the eighth positive going transition (including the transition at t=0) of waveform 260 so that waveform 264, at the Q4 output of counter 204, has a positive going transition 270 at t=1.26 seconds. Transition 270 occurs simultaneously with the eighth positive going transition 272 of waveform 260. The positive going transition 266 of waveform 262, at the $\bar{Q}$ output of monostable 208, is applied to the reset (RST) input of counter 204 to cause the counter to derive a 150 millisecond pulse in response to every eighth positive going transition of waveform 260. The output pulse at terminal Q4 of counter 204 terminates before the next positive going transition 266 of waveform 262 causes the next positive going of waveform 260.

Waveforms 272, 274, 276, 278 and 280, respectively at the Q4 output of counter 204, the Q output of monostable 206, the $\bar{Q}$ output of monostable 210 and at the output of NAND gate 222, are illustrated in FIG. 9, having a shorter and shifted time base relative to FIG. 8. The 150 millisecond pulses of waveform 272 have leading edge transitions spaced from each other by 1.4 seconds; waveform 272 is applied to monostable 206. The resistor and capacitor connected to monostable 206 cause the monostable to derive at the Q output thereof pulses having durations of 400 milliseconds. The 400 millisecond pulses have leading edges occurring simultaneously with the leading edges of the pulses of waveform 272. The 400 millisecond pulses of waveform 274 are applied to 5.4 kHz oscillator 179. Oscillator 179 responds to the pulses of waveform 274 to produce a 5.4 kHz carrier frequency burst having a 400 millisecond duration every 1.4 seconds. The 5.4 kHz carrier bursts from the oscillator including integrated circuit 179 drive transducer 46 so that the transducer produces 400 millisecond 5.4 kHz clicks once every 1.4 seconds while dog 10 is in the range of transducers 42 and 44.

If dog 10 is still in the beam radiated from one of transducers 42 and 44 1.4 seconds after such a click has been emitted by transducer 46, a shock is administered to the dog by electrodes 48 and 50 at the same time the dog hears a second click. To these ends, waveform 276 is derived from the $\bar{Q}$ output of monostable 210. Waveform 276 is a rectangular wave, having adjacent positive going edges 280 spaced from each other by 2.8 seconds. Negative going transitions 282 are spaced from the positive going transition 280 immediately adjacent thereto by 1.3 seconds. Thereby, waveform 276 includes pulses having a duration of 1.3 seconds, spaced from each other by 1.5 seconds. Negative going transitions 282 are triggered by positive going transitions of waveform 272, while the positive going transitions occur at a time determined by the resistor and capacitor connected to monostable 210. The duration of each pulse of waveform 276 is such that the frequency of the $\bar{Q}$ output of monostable 210 is one-half the frequency of waveform 272.

Positive going transitions 280 of waveform 276, at the $\bar{Q}$ output of monostable 210 are combined with negative going transitions at the Q output of monostable 206 in NAND gate 220, which drives NAND gate 222. Waveform 278 at the output of inverter 222 is thus a series of pulses having positive going leading edges 284 synchronized with positive going edges 280 at the $\bar{Q}$ output of monostable 210 and negative going trailing edges 286, synchronized with the negative going edges of alternate pulses of waveform 274, at the Q output of monostable 206. Adjacent leading edges 280 are spaced from each other by 2.8 seconds.

In response to each trailing edge 286 at the output of gate 222, the astable multivibrator including integrated circuit 192 is activated, which in turn activates timer 194. Timer 194 responds to each negative going transition at the Q output of multivibrator 192 to derive a pulse having a duration of 180 microseconds. The 180 microsecond pulse is supplied to the gate of field effect transistor 236, to forward bias the field effect transistor so current flows from capacitor 242 through primary winding 238 to supply a voltage of approximately 2500 volts between electrodes 48 and 50. The voltage is applied only after the trailing edge of one pulse of waveform 274 has occurred, followed by an interval equal to the time separation between adjacent pulses. Hence, dog 10 is given one audible warning plus an additional time interval before the shock and an additional aural warning are administered. The use of the audible warning is likely, with training, to prevent the dog from moving through the barrier formed by the ultrasonic carrier wave bursts emitted from housings 24–32.

Figure 10B:
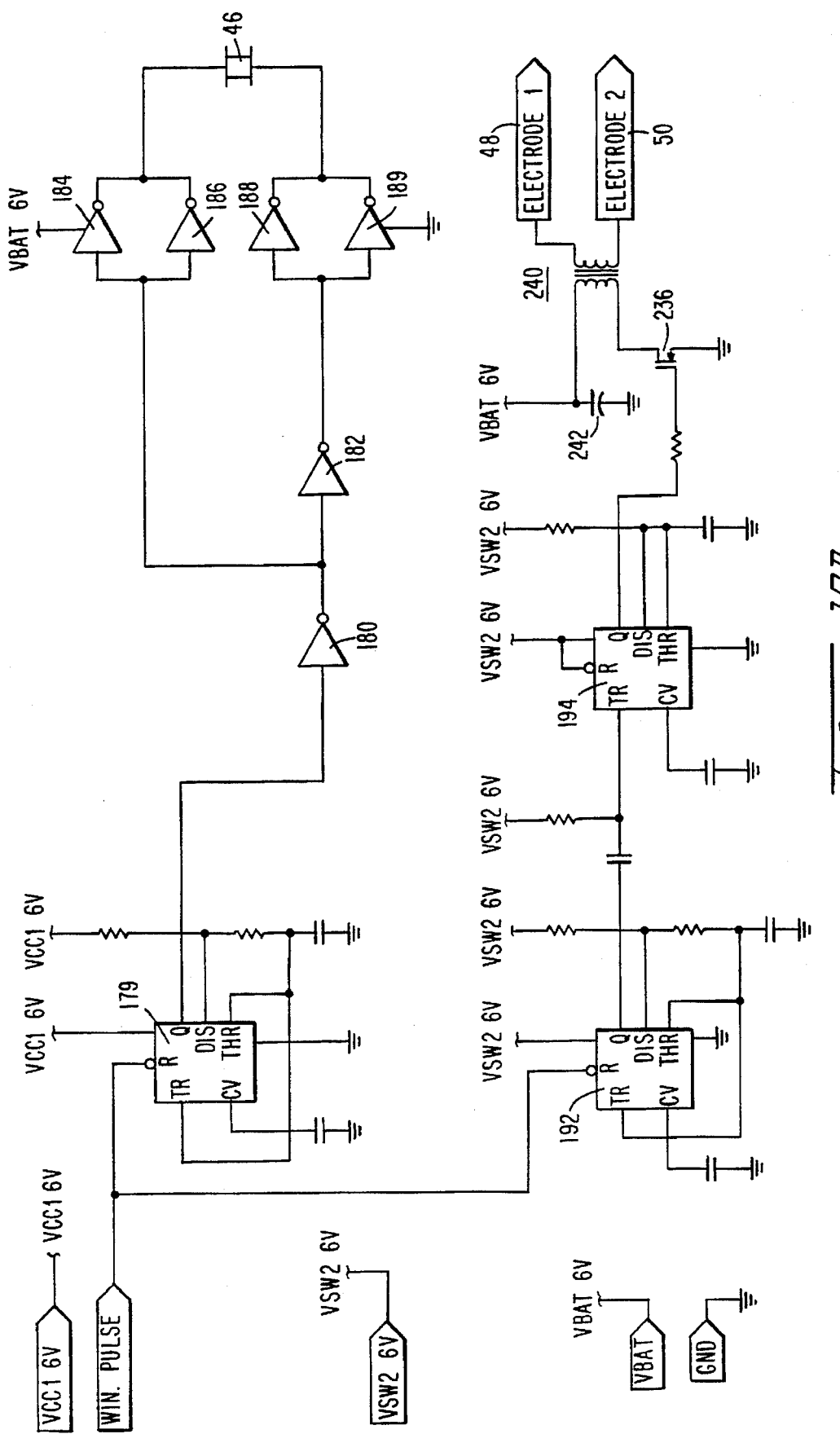

In another embodiment, illustrated in FIGS. 10a and 10b, the aural click and shock are always administered to the animal at the same time. The circuit of FIGS. 10a and 10b is very similar to the circuit of FIGS. 6a and 6b except that gates 220 and 222, as well as monostable 210, are eliminated. The reset (R) input of astable 50 Hz oscillating multivibrator 192 is DC coupled to the Q output of monostable 206. Thereby, integrated circuit 179 is triggered to oscillate at 5.4 kHz to activate transducer 46 simultaneously with integrated circuit 192 being triggered into 50 Hz oscillation causing a high voltage pulse to be supplied to electrodes 48 and 50.

While there have been described and illustrated several specific embodiments of the invention, it will be clear that variations in the details of the embodiments specifically illustrated and described may be made without departing from the true spirit and scope of the invention as defined in the appended claims.

We claim:

1. A method of deterring entry of an animal into a barrier region comprising emitting a beam of radiant wave energy from an above ground source in the region, receiving the emitted radiant energy beam at the animal, and in response to receipt of the radiant wave energy in the beam at the animal, applying to the animal a stimulus tending to prevent entry of the animal into the beam.

2. The method of claim 1 wherein the radiant wave energy is a compressional wave.

3. The method of claim 2 wherein a plurality of said beams are emitted from plural discrete sites along the barrier region.

4. The method of claim 3 wherein the sites are in line of sight with each other and are above ground.

5. The method of claim 4 wherein the beams have a width no greater than about 15°.

6. The method of claim 5 wherein a pair of said beams having bore sight axes directed in different directions are emitted from each site.

7. The method of claim 6 wherein the directions are displaced by about 180°.

8. The method of claim 6 wherein the directions are displaced by about 90°.

9. The method of claim 1 wherein a plurality of said beams are emitted from plural discrete sites along the barrier region.

10. The method of claim 9 wherein a pair of said beams having bore sight axes directed in different directions are emitted from each site.

11. The method of claim 10 wherein at least some of the directions are displaced by about 180°.

12. The method of claim 10 wherein at least some of the directions are displaced by about 90°.

13. The method of claim 1 wherein a plurality of beams similar to said beam are emitted from the sites that are in line of sight with each other and are above ground.

14. The method of claim 13 wherein the beams have a width no greater than about 15°.

15. The method of claim 1 wherein the beam has a width no greater than about 15°.

16. The method of claim 1 wherein a plurality of said beams are emitted along the barrier region.

17. The method of claim 1 wherein a plurality of said beams are emitted from approximately the same site along the barrier region.

18. Apparatus for deterring entry of an animal into a barrier region comprising means for emitting a beam of radiant wave energy from an above ground source in the region, means at the animal for receiving the emitted radiant energy beam, and means at the animal responsive to receipt of the radiant wave energy in the beam for applying to the animal a stimulus tending to prevent entry of the animal into the beam.

19. The apparatus of claim 18 wherein the radiant wave energy is a compressional wave.

20. The apparatus of claim 19 wherein the means for emitting includes means for emitting a plurality of said beams along the barrier region.

21. The apparatus of claim 20 wherein the means for emitting includes means for emitting a plurality of said beams along the barrier region from one site.

22. The apparatus of claim 20 wherein the means for emitting includes means for emitting a plurality of said beams along the barrier region from plural sites.

23. The apparatus of claim 22 wherein the sites are in line of sight with each other and are above ground.

24. The apparatus of claim 20 wherein the beams have a width no greater than about 15°.

25. The apparatus of claim 20 wherein a pair of said beams having bore sight axes directed in different directions are emitted from each of plural sites.

26. The apparatus of claim 25 wherein the directions are displaced by about 180°.

27. The apparatus of claim 25 wherein the directions are displaced by about 90°.

28. The apparatus of claim 18 wherein the means for emitting includes means for emitting a plurality of said beams along the barrier region.

29. The apparatus of claim 18 wherein the beam has a width no greater than about 15°.

30. Apparatus for deterring entry of an animal across a boundary comprising means for propagating above ground and along the boundary a beam of radiant wave energy, the beam being transmitted so it is confined to the boundary, means at the animal for receiving the emitted radiant energy beam, and means at the animal responsive to receipt of the radiant wave energy in the beam for applying to the animal a stimulus tending to prevent entry of the animal into the beam.

31. A method of deterring entry of an animal across a boundary comprising directing above ground and along the boundary a beam of radiant wave energy that is confined to the boundary; and applying to the animal a stimulus tending to prevent entry of the animal into the beam in response to receipt of the radiant wave energy in the beam at the animal.

* * * * *